US012636805B2

(12) United States Patent
Marich et al.

(10) Patent No.: US 12,636,805 B2
(45) Date of Patent: May 26, 2026

(54) CUTTING TOOL

(71) Applicant: MILWAUKEE ELECTRIC TOOL CORPORATION, Brookfield, WI (US)

(72) Inventors: Milorad Marich, Mequon, WI (US); Jonathan G. Winter, Burlington, WI (US); Zachary D. Bernaden, Milwaukee, WI (US); Bryson Wilcox, Kenosha, WI (US); Nicholas Powers Wilkins, Golden, CO (US); Forrest Nile Getz, Arvada, CO (US); Trevor Patrick Gill, New Berlin, WI (US); Devin Lee Aragon, Westminster, CO (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 184 days.

(21) Appl. No.: 18/140,940

(22) Filed: Apr. 28, 2023

(65) Prior Publication Data

US 2023/0347540 A1 Nov. 2, 2023

Related U.S. Application Data

(60) Provisional application No. 63/336,017, filed on Apr. 28, 2022.

(51) Int. Cl.
*B26D 3/16* (2006.01)

(52) U.S. Cl.
CPC .................................... *B26D 3/169* (2013.01)

(58) Field of Classification Search
CPC ......... B26D 3/169; B26B 13/18; B26B 13/26; B26B 13/04; B26B 13/28; B26B 13/14;
(Continued)

(56) References Cited

U.S. PATENT DOCUMENTS 2,719,357 A * 10/1955 Laverty .................... B26B 13/24 30/142
3,636,954 A * 1/1972 Weston .............. A61B 17/2804 606/208

(Continued)

FOREIGN PATENT DOCUMENTS

CN 106965212 A * 7/2017 ............. B26B 13/06

OTHER PUBLICATIONS

Sun et al.,. Bionic Design of a Disposable Compliant Surgical Forceps With Optimized Clamping Performance. 2020 42 Annual International Conference of the IEEE Conference Paper, Jul. 2020. (cont below) . . . (Year: 2020).*

(Continued)

*Primary Examiner* — Jennifer S Matthews
(74) *Attorney, Agent, or Firm* — Michael Best & Friedrich LLP

(57) ABSTRACT

A cutting tool including a first handle, a second handle, a first head portion, and a second head portion. A force transfer mechanism interconnects the first handle, the second handle, the first head portion, and the second head portion. The force transfer mechanism includes a plurality of flexible links configured to resiliently deform and move the first head portion toward the second head portion in response to movement of the first handle toward the second handle. The first and second handle portions and the first and second head portions are integrally formed together with the force transfer mechanism as a single monolithic structure.

20 Claims, 3 Drawing Sheets

(58) Field of Classification Search
CPC ........... B26B 17/00; B25B 7/12; B25G 1/102; A61B 17/2804; A61B 17/2816
See application file for complete search history.

(56) References Cited

U.S. PATENT DOCUMENTS

| | | | | | |
|---|---|---|---|---|---|
| 3,921,640 | A * | 11/1975 | Freeborn | A61B 17/062 | 606/147 |
| 4,526,172 | A * | 7/1985 | Stephenson | A61B 17/2804 | 606/208 |
| 4,715,639 | A * | 12/1987 | Nicoletta | A47G 21/103 | 294/99.2 |
| 5,459,929 | A * | 10/1995 | Linden | B25B 7/08 | 30/271 |
| 8,652,036 | B2 * | 2/2014 | Terry | A61B 17/0231 | 600/206 |
| 8,863,623 | B2 * | 10/2014 | Nashimoto | B25B 7/12 | 81/417 |
| 10,449,683 | B2 * | 10/2019 | Spencer | B26B 21/4018 | |
| 2012/0102752 | A1 | 5/2012 | Steele et al. | | |

OTHER PUBLICATIONS

Retrieved on Jan. 25, 2025].<URL:https://www.researchgate.net/publication/343936104_Bionic_Design_of_a_Disposable_Compliant_Surgical_Forceps_With_Optimized_Clamping_Performance>. (Year: 2020).*

* cited by examiner

CUTTING TOOL

CROSS-REFERENCE TO RELATED APPLICATIONS

This application claims priority to, prior-filed U.S. Provisional Patent Application No. 63/336,017, filed on Apr. 28, 2022, the entire contents of which are incorporated by reference herein.

FIELD OF THE DISCLOSURE

The present disclosure relates to hand tools, and more specifically to handheld cutting tools, such as tubing cutters.

BACKGROUND OF THE DISCLOSURE

The use of tubes, including PEX (cross-linked polyethylene) tubes has become popular in plumbing. The tubes are lower cost than copper and are suitable for use in the construction of new buildings and homes. Tubes can be cut to a desired length using a tubing cutter. A typical handheld tubing cutter may comprise numerous components (e.g., handles, springs, pivot pins, and the like), made of different materials (e.g., plastic, steel, aluminum, etc.). These components are typically formed separately and then assembled together.

SUMMARY OF THE DISCLOSURE

The present disclosure provides, in one aspect, a cutting tool including a first handle, a second handle, a first head portion, and a second head portion. A force transfer mechanism interconnects the first handle, the second handle, the first head portion, and the second head portion. The force transfer mechanism includes a plurality of flexible links configured to resiliently deform and move the first head portion toward the second head portion in response to movement of the first handle toward the second handle. The first and second handle portions and the first and second head portions are integrally formed together with the force transfer mechanism as a single monolithic structure.

The present disclosure provides, in another aspect, a cutting tool including a first handle, a second handle, a first head portion, a second head portion, and a longitudinal axis extending along a length of the tool. The first handle and the first head portion are disposed on a first side of the longitudinal axis, and the second handle and the second head portion are disposed on a second side of the longitudinal axis. A force transfer mechanism is disposed between the first handle and the first head portion and also is disposed between the second handle and the second head portion. The force transfer mechanism is capable of transferring force from the first and second handles to the first and second head portions. The first head portion is actuated toward the second head portion in response to movement of the first handle toward the second handle and the second head portion is actuated toward the first head portion in response to movement of the second handle toward the first handle.

The present disclosure provides, in another aspect, a cutting tool including a first handle and a second handle, and a first head portion and a second head portion. A force transfer mechanism interconnects the first handle, the second handle, the first head portion, and the second head portion. The force transfer mechanism includes a plurality of flexible links configured to resiliently deform and move the first head portion toward the second head portion in response to movement of the first handle toward the second handle. The plurality of links define a first width that is the same as a second width defined by the first and second head portions.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
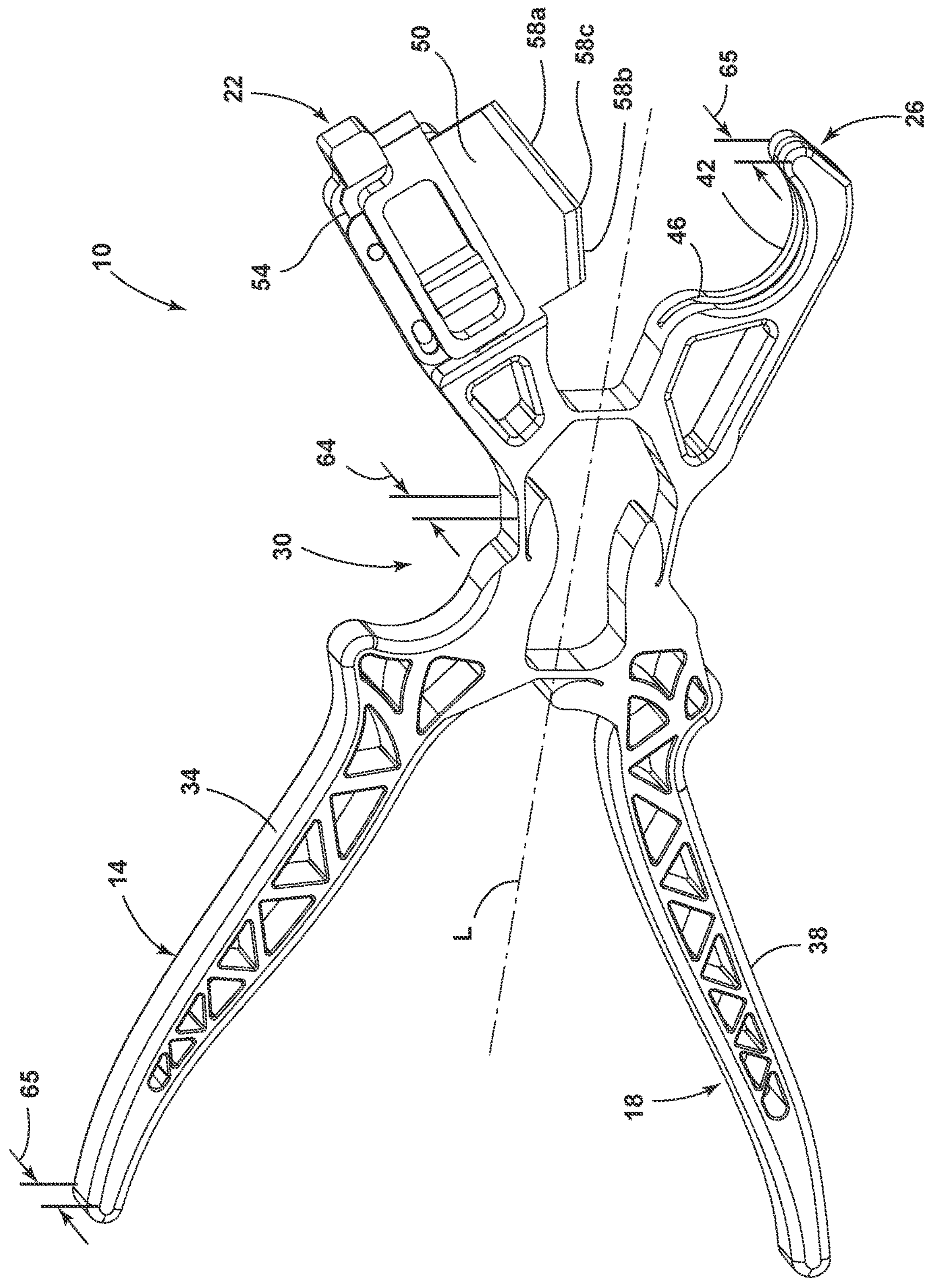
FIG. 1 is perspective view of a cutting tool in accordance with an embodiment of the disclosure.

FIG. 1 illustrates a hand tool in the form of a cutting tool 10. The cutting tool 10 includes a first handle 14, a second handle 18, a first head portion 22, and a second head portion 26. As described in greater detail below, the handles 14, 18 are movable toward one another from an open position (shown in FIG. 1) to a closed or actuated position to move the head portions 22, 26 toward one another and perform a cutting operation. A force transfer mechanism 30—which in the illustrated embodiment is integrally formed as a single monolithic structure with the handles 14, 18 and head portions 22, 26—interconnects the handles 14, 18 and the head portions 22, 26 to control movement thereof.

The illustrated cutting tool 10 is elongated in a length direction along a longitudinal axis L, which extends centrally through the cutting tool 10. The first handle 14 and the first head portion 22 are generally disposed on a first side of the longitudinal axis L, and the second handle 18 and second head portion 26 are generally disposed on a second, opposite side of the longitudinal axis L. The first handle 14 has a first curved outer surface 34, and the second handle 18 has a second curved outer surface 38. The curved outer surfaces 34, 38 are preferably contoured for a comfortable fit within a user's hand.

With continued reference to FIG. 1, the illustrated cutting tool 10 is configured for cutting tubes, and more specifically plastic tubes such as PEX (cross-linked polyethylene) tubes. As such, the second head portion 26 includes a semi-circular recess 42 sized and shaped to receive a tube to be cut. A slot 46 extends centrally along the length of the recess 42. The slot 46 is sized, shaped, and positioned to receive at least a portion of a blade 50 mounted to a blade holder 54 on the first head portion 22. The illustrated blade 50 has a cutting edge with a first edge portion **58*a* and a second edge portion 58*b* converging to a point 58*c*. The edge portions 58*a*, 58*b* are obliquely oriented relative to one another, which facilitates a clean cut through a tube. In other embodiments, however, the blade 50 may have different geometries (e.g., for different cutting applications). For example, in other embodiments, the cutting tool 10** may be a pliers, pruner, snips, scissors, or any other such two-handled cutting tool.

Figure 2:
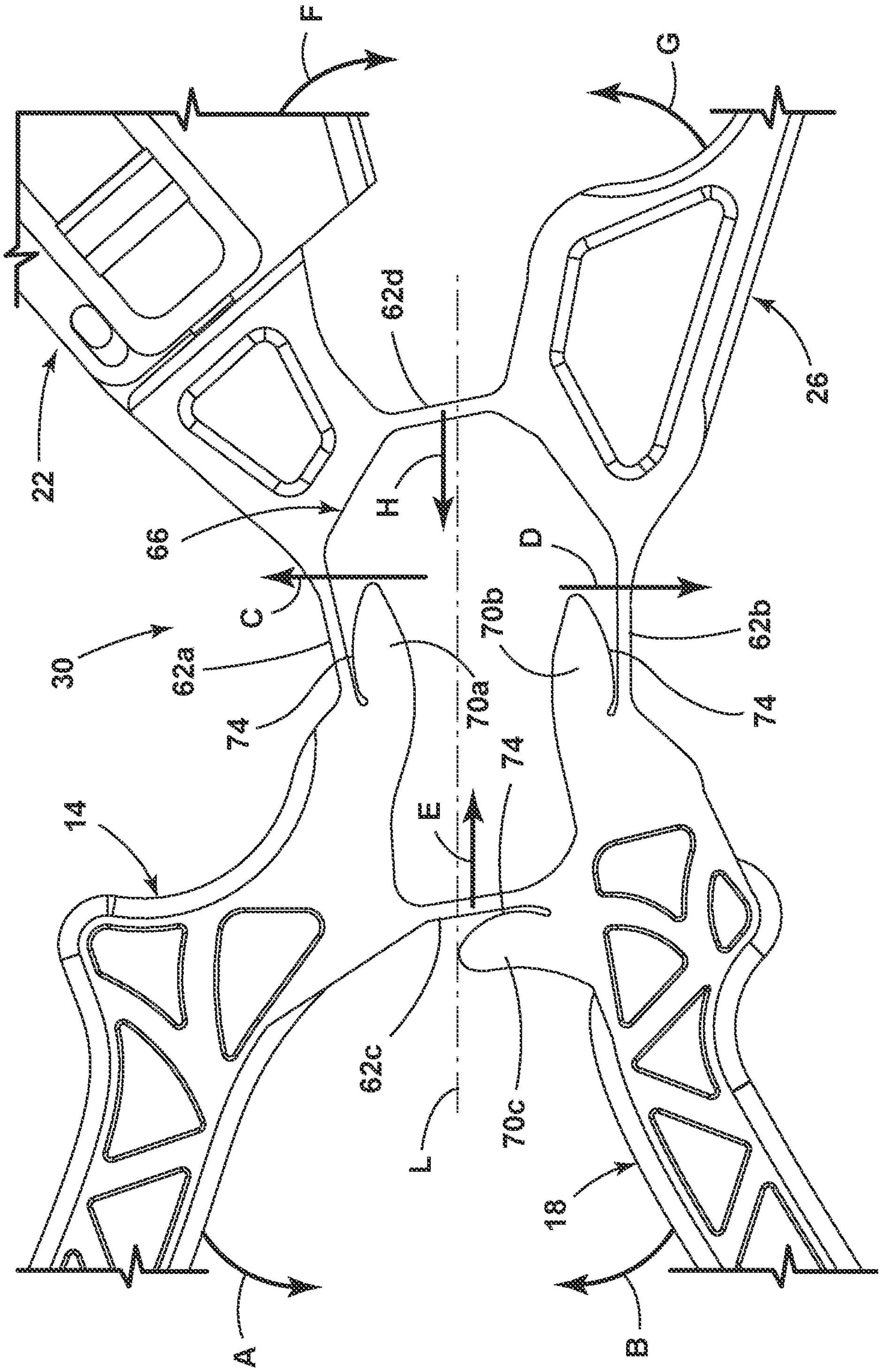
FIG. 2 is an enlarged side view illustrating a force transfer mechanism of the cutting tool of FIG. 1.

Referring to FIG. 2, the force transfer mechanism 30 includes a first flexible link 62*a*, a second flexible link 62*b*, a third flexible link 62*c*, and a fourth flexible link 62*d*. The first flexible link 62*a* extends between the first handle 14 and the first head portion 22. The second flexible link 62*b* extends between the second handle 18 and the second head portion 26. The third flexible link 62*c* extends between the first handle 14 and the second handle 18. The fourth flexible link 62*d* extends between the first head portion 22 and the second head portion 26. In the illustrated embodiment, the flexible links 62*a-d* form the periphery (i.e., boundary) of a closed aperture 66.

With continued reference to FIG. 2, the illustrated force transfer mechanism 30 further includes a first support projection 70*a* extending from the first handle 14 adjacent the first link 62*a*, a second support projection 70*b* extending from the second handle 18 adjacent the second link 62*b*, and a third support projection 70*c* extending from the second handle 18 adjacent the third link 62*c*. Each of the support projections 70*a-c* includes a curved engagement surface 74 facing the adjacent link 62*a-c*. The links 62*a-d* are formed from thin segments of a fiber-reinforced polymer material, such as a composite material including nylon and chopped carbon fiber strands. The thinness and material of the links 62*a-d* allows the links 62*a-d* to resiliently deform (i.e., via elastic deformation) when force is applied to the handles 14, 18 of the cutting tool 10. The links 62*a-d* are thinner than the handles 14, 18 and the head portions 22, 26. However, the links 62*a-d* define a first width 64 that is equal to a second width 65 of the handles 14, 18 and the head portions 22, 26.

Figure 4:
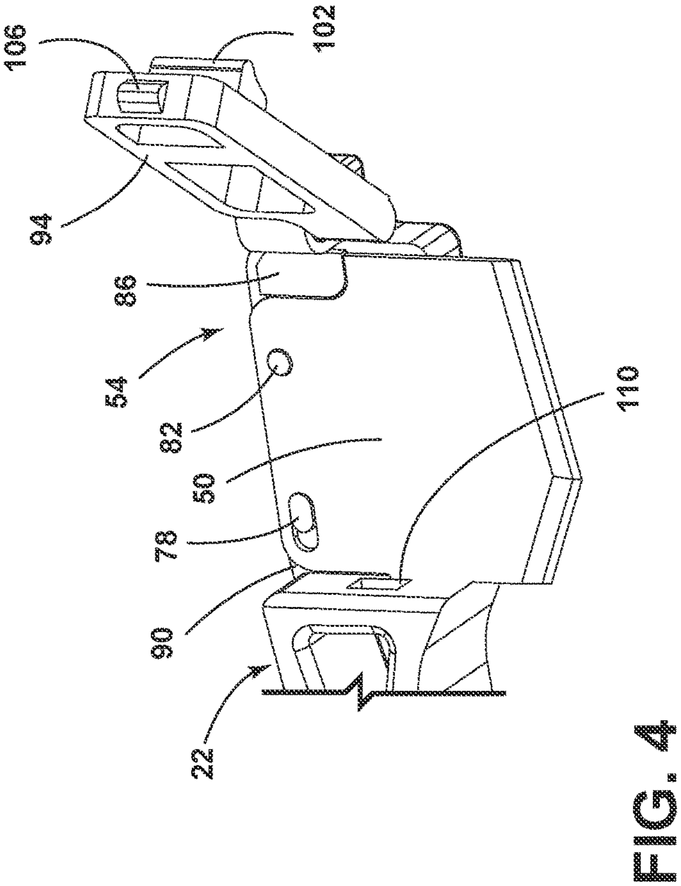
FIG. 4 is an enlarged perspective view illustrating the blade retainer of FIG. 3 in an open position.
Figure 3:
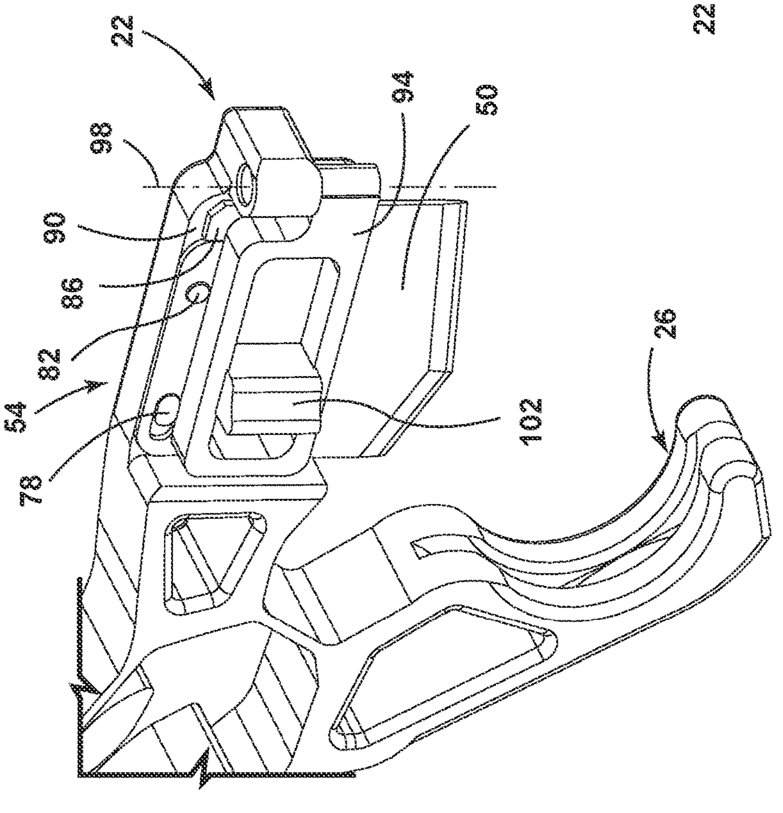
FIG. 3 is an enlarged perspective view illustrating a blade retainer of the cutting tool of FIG. 1 in a closed position.

Referring to FIGS. 3-4, the blade holder 54 advantageously allows for tool-free removal and replacement of the blade 50. In the illustrated embodiment, the blade holder 54 includes an elongated post 78, a cylindrical post 82, and a shoulder 86 extending from a planar blade receiving surface 90 on the first head portion 22. The elongated post 78, cylindrical post 82, and shoulder 86 engage corresponding features of the blade 50 to locate and support the blade 50 on the blade receiving surface 90. The blade holder 54 further includes a latch 94 pivotally coupled to the first head portion 22 and pivotable about an axis 98 between a closed position (FIG. 3), in which the latch 94 engages and retains the blade 50, and an open position (FIG. 4), in which the latch 94 is pivoted away from the blade 50, permitting the blade 50 to be disengaged from the posts 78, 82 and shoulder 86. In the illustrated embodiment, the latch 94 includes a handle 102 to facilitate movement of the latch 94 between the open and closed positions. In addition, the latch 94 has a rounded projection 106 on its free end, which is received in a recess 110 on the first head portion 22 when the latch 94 is in the closed position to retain the latch 94 in the closed position.

In use, a user may grasp the handles 14, 18 of the cutting tool 10 in one hand and squeeze the handles 14, 18 together, in the direction of arrows A and B in FIG. 2. The force and resulting movement of the handles 14, 18 causes the engagement surfaces 74 of the support projections 62*a-c* to gradually engage and resiliently bend the flexible links 62*a-c* in the direction of arrows C, D, and E, respectively. This deflection in turn causes the head portions 22, 26 to pivot towards each other in the directions of arrows F and G, and the fourth flexible link 62*d* to resiliently bend inwardly in the direction of arrow H. As the head portions 22, 26 pivot towards each other in the directions of arrows F and G, the blade 50 may engage and cut through a tube (not shown) positioned in the recess 42 (FIG. 1). The blade 50 travels through the tube and into the slot 46, until the blade 50 has cut through the entire diameter of the tube. Once the tube is cut, the user may stop applying force to the handles 14, 18. The bent flexible links 62*a-d* act as living springs and provide a resilient recovery force that moves the handles 14, 18 back to their initial open position.

The handles 14, 18, head portions 22, 26, and force transfer mechanism 30 are integrally formed together as a single monolithic structure, and made of the fiber-reinforced polymer material. In some embodiments, the structure is formed using an additive manufacturing process, such as by 3D-printing, using a printable fiber-reinforced polymer material such as ONYX. The latch 94 and blade 50 may be formed separately and subsequently coupled to the first head portion 22. Thus, in the illustrated embodiment, the entire cutting tool 10 comprises only three parts. This greatly simplifies manufacturing and assembly of the cutting tool 10. In addition, the fiber-reinforced polymer construction of the cutting tool 10 provides significant weight savings (e.g., 47%) compared to typical cutting tools.

Various features of the invention are set forth in the following claims.

What is claimed is:

1. A cutting tool comprising:

a first handle, a second handle, a first head portion, and a second head portion; and a force transfer mechanism interconnecting the first handle, the second handle, the first head portion, and the second head portion, wherein the force transfer mechanism includes a plurality of flexible links configured to resiliently deform and move the first head portion toward the second head portion in response to movement of the first handle toward the second handle, and a plurality of support projections engageable with the plurality of flexible links in response to movement of the first handle toward the second handle, and wherein the first and second handle portions and the first and second head portions are integrally formed together with the force transfer mechanism as a single monolithic structure.

2. The cutting tool of claim 1, further including a blade removably coupled to a blade holder of the first head portion.

3. The cutting tool of claim 2, further including a latch movable between an open position and a closed position, wherein the latch retains the blade when in the closed position and permits removal of the blade from the blade holder when in the open position.

4. The cutting tool of claim 1, wherein the plurality of flexible links includes a first link extending between the first handle and the first head portion, and a second link extending between the second handle and the second head portion.

5. The cutting tool of claim 4, wherein the plurality of flexible links includes a third link extending between the first handle and the second handle.

6. The cutting tool of claim 5, wherein the plurality of flexible links includes a fourth link extending between the first head portion and the second head portion.

7. The cutting tool of claim 1, wherein the plurality of flexible links forms a periphery of a closed aperture.

8. The cutting tool of claim 1, wherein the single monolithic structure is formed by an additive manufacturing process.

9. The cutting tool of claim 1, wherein the single monolithic structure is made of a fiber-reinforced polymer material.

10. A cutting tool comprising:

a first handle;

a second handle;

a first head portion;

a second head portion;

a longitudinal axis extending along a length of the tool, wherein the first handle and the first head portion are disposed on a first side of the longitudinal axis, and wherein the second handle and the second head portion are disposed on a second side of the longitudinal axis;

a blade removably coupled to the first head portion by a blader holder, the blade holder including a post receivable in an aperture of the blade, a shoulder engageable with an edge of the blade, and a latch pivotable about an axis between an open position and a closed position, the latch configured to engage and retain the blade in the closed position; and a force transfer mechanism disposed between the first handle and the first head portion and also disposed between the second handle and the second head portion, the force transfer mechanism capable of transferring force from the first and second handles to the first and second head portions, wherein the first head portion is actuated toward the second head portion in response to movement of the first handle toward the second handle and the second head portion is actuated toward the first head portion in response to movement of the second handle toward the first handle.

11. The cutting tool of claim 10, wherein the first and second handle portions and the first and second head portions are integrally formed together with the force transfer mechanism as a single monolithic structure.

12. The cutting tool of claim 10, wherein the force transfer mechanism includes a plurality of flexible links configured to resiliently deform and move the first head portion toward the second head portion in response to movement of the first handle toward the second handle.

13. The cutting tool of claim 12, wherein the plurality of flexible links includes a first link extending between the first handle and the first head portion, and a second link extending between the second handle and the second head portion.

14. The cutting tool of claim 13, wherein the plurality of flexible links includes a third link extending between the first handle and the second handle.

15. The cutting tool of claim 14, wherein the plurality of flexible links includes a fourth link extending between the first head portion and the second head portion.

16. The cutting tool of claim 10, wherein the latch includes a projection, wherein the first head portion includes a recess, and wherein the projection is received in the recess when the latch is in the closed position to retain the latch in the closed position.

17. A cutting tool comprising:

a first handle and a second handle;

a first head portion and a second head portion; and a force transfer mechanism interconnecting the first handle, the second handle, the first head portion, and the second head portion, wherein the force transfer mechanism includes a plurality of flexible links configured to resiliently deform and move the first head portion toward the second head portion in response to movement of the first handle toward the second handle, and a plurality of support projections engageable with the plurality of flexible links in response to movement of the first handle toward the second handle, and wherein the plurality of links define a first width that is the same as a second width defined by the first and second head portions.

18. The cutting tool of claim 17, wherein the first and second handles are equal to the second width.

19. The cutting tool of claim 17, wherein the first and second handle portions and the first and second head portions are integrally formed together with the force transfer mechanism as a single monolithic structure.

20. The cutting tool of claim 17, wherein the plurality of links includes a first link extending between the first handle and the first head portion, and a second link extending between the second handle and the second head portion.

* * * * *